(12) United States Patent
Möster et al.

(10) Patent No.: US 6,411,719 B1
(45) Date of Patent: Jun. 25, 2002

(54) LOUDSPEAKER ASSEMBLY

(75) Inventors: Erik Möster; Paul Larsson; Mats Olsson, all of Malmö; Olof Simonsson, Lund; Mats Larsson; Rafael Portela, both of Malmö, all of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/572,231

(22) Filed: May 17, 2000

(30) Foreign Application Priority Data

May 18, 1999 (SE) ................................. 9901794

(51) Int. Cl.[7] ................................. H04R 1/02
(52) U.S. Cl. .................... 381/345; 381/351; 381/162; 379/433.02
(58) Field of Search ................ 381/345, 351, 381/353, 354, 162, 386, FOR 151, 163; 455/90, 347, 350, 351; 379/428, 430, 433, 433.02, 428.02; 361/814

(56) References Cited

U.S. PATENT DOCUMENTS 5,790,679 A * 8/1998 Hawker et al. ............. 379/428

FOREIGN PATENT DOCUMENTS

| EP | 0 459 181 | 12/1991 |
| GB | 2 310 559 | 8/1997 |
| WO | 98/31192 | 7/1998 |

* cited by examiner

*Primary Examiner*—Huyen Le
(74) *Attorney, Agent, or Firm*—Burns, Doane, Swecker & Mathis, L.L.P.

(57) ABSTRACT

A loudspeaker assembly for use in electronic devices especially hand held communication devices e.g. a cellular mobile telephone, comprising a loudspeaker (12) for emitting sound through a front cover (9), and a board (8) for mounting components, the board (8) having a first side (10) carrying user interface means (5) accessible through the front plate (9), and a second side (11), facing towards a back cover (7). The loudspeaker (12) is mounted between the board (8) and the back cover (7). Thereby the electronic devices can be made very compact.

11 Claims, 2 Drawing Sheets

LOUDSPEAKER ASSEMBLY

This application claims priority under 35 U.S.C. §§119 and/or 365 to 9901794-9 filed in Sweden on May 18, 1999; the entire content of which is hereby incorporated by reference.

This invention relates to a loudspeaker assembly for use in electronic devices, comprising a loudspeaker for emitting sound through a front cover, and a board for mounting components, the board having a first side carrying user interface means accessible through the front plate, and a second side facing towards a back cover.

On the market for small-sized hand held electronic equipment especially mobile telephones, user friendliness is an extremely important parameter in the competition with other vendors of mobile telephones. The development of integrated circuit technology has made it possible to incorporate numerous functions which involve interaction with the user via a user interface. Typically, a user interface comprises relatively large components like a keypad and a display. In different types of electronic equipment, e.g. mobile telephones, a loudspeaker and/or a microphone is also incorporated in the electronic equipment.

When it is a requirement e.g. that it shall be possible to have access to all functions of the electronic device via a front cover, and that the overall size of the electronic equipment shall be small enough to be held and operated by one hand, the overall size of the electronic device constrains the size of the individual components i.e. the keypad, the display, etc. Thereby the display and the keypad get very small and inconvenient to use.

From a first type of marketed mobile telephones it is well-known to mount a loudspeaker on the back of a front cover and to connect the loudspeaker to a printed circuit board, PCB, by means of wires. However, this solution is inconvenient in that the speaker occupies much space at the backside of the front cover. This in turn limits the possible maximum size of other components accessible via the front cover. Moreover, such a mobile telephone is rather expensive to manufacture due to the task of mounting the electrical wires.

From a second type of marketed mobile telephones it is well-known to mount a loudspeaker on that side of a printed circuit board that faces towards the front cover. However, this solution is also inconvenient in that the speaker occupies much space at the backside of the front cover. Such mobile phones are also rather expensive to manufacture due to the task of mounting, involving soldering, the speaker on the surface of the printed circuit board.

Consequently, the prior art involves the problem that the loudspeaker occupies too much space at the backside of the front cover of an electronic device.

Thus an object of this invention is to provide a loudspeaker assembly which utilizes the space in electronic devices in a more convenient way.

This is achieved when the loudspeaker assembly mentioned in the opening paragraph is characterized in that the loudspeaker is mounted between the board and the back cover.

Consequently, the size and the position of other components such as a keypad and a display are riot constrained by the loudspeaker. Moreover, the front cover can be made free for electromechanical components. This may facilitate exchangeable front covers, since it is possible to manufacture cheaper front covers. Further, a designer of an electronic device comprising a loudspeaker assembly according to the invention is allowed to design with a larger degree of freedom.

When the board has an opening for transmission of sound, sound is transmitted from the loudspeaker to a listener/user.

In an expedient embodiment the loudspeaker assembly comprises a first resonance box including an opening through the front cover and an opening through the board and the first resonance box is otherwise closed.

When the loudspeaker assembly comprises a second resonance box which is coupled to the loudspeaker, including an opening through the board, and which is otherwise closed an additional resonance box is created and the high frequency response of the speaker assembly is enhanced. Consequently, it is possible to reduce the effect of the space surrounding the electronic device, e.g. the ear cavity of a listener, in the reproduction of sound. Further, it the loudspeaker assembly is placed close to a microphone operated in connection with the loudspeaker the resonance boxes may reduce or eliminate undesired acoustical feed-back from the loudspeaker to the micro phone.

This is possible in particular when the opening through the board connects the first and second resonance boxes.

In a particular expedient embodiment the first resonance box has a relatively small cross sectional area in a plane substantially parallel to the board compared to the cross sectional area, in a plane substantially parallel to the board, of the second resonance box. Thereby sound is transferred from the loudspeaker to the listener via two resonance boxes which can be designed for a specific sound transmission, while very little space is occupied on the back side of the front cover.

This is also possible when the first resonance box has a relatively small cross sectional area in a plane substantially parallel to the board compared to the diameter of the loudspeaker.

The loudspeaker may be attached to the second side of the board to form a resonance box between the board and the loudspeaker. Thereby only a minimum of effort is needed in mounting the speaker when high-volume production of electronic devices is considered.

Alternatively, the loudspeaker may be attached to the inner side of the back plate, the inner side facing towards the second side of the board. Hereby, it is possible to mount the speaker on the back cover independently of the process of mounting other components on the printed circuit board.

In an expedient embodiment a first side of the loudspeaker is coupled to the second resonance box and a second side of the loudspeaker is coupled to another volume by means of a sound channel. Thereby an additional design parameter is included.

When the loudspeaker is connected to the board by means of electrical connectors extending within the second resonance box a very compact and cost-effective solution for high-volume production is obtained.

Moreover, the invention relates to a mobile telephone comprising a loudspeaker assembly.

BRIEF DESCRIPTION OF THE DRAWINGS

The invention will be explained more fully below in connection with a preferred embodiment and with reference to the drawing, in which.

DETAILED DESCRIPTION OF A PREFERRED EMBODIMENT

Typically, an electronic device such as a mobile telephone comprises a front cover and a back cover forming a housing for different types of electrical and electromechanical components. In the following the volume enclosed by the housing is denoted the 'interior' and the volume not enclosed by the housing is denoted the 'surround'.

Figure 1:
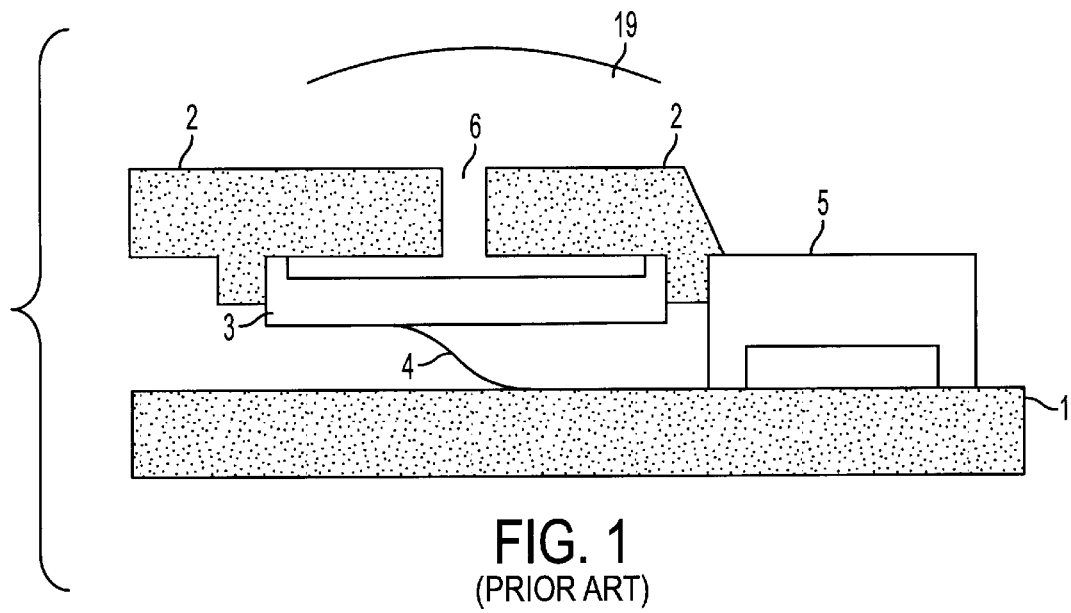
FIG. 1 shows a prior art embodiment of a loudspeaker assembly.

FIG. 1 shows a cross-sectional view through a prior art embodiment of a loudspeaker assembly in an electronic device. In this embodiment a loudspeaker 3 is mounted on the back side of a front cover 2 having an opening 6 for transmission of sound from the loudspeaker 3 to the surroundings. The loudspeaker is electrically connected to a printed circuit board 1 by means of a wire 4. The means 5 is adapted for operating the electronic device e.g. a mobile telephone. Such means can be e.g. a display or a keypad.

The electronic device is designed such that a user/listener can hold the electronic device in his hand and with the front cover against his cheek while the opening 6 is opposite to the user's ear 19. However, the means 5 is limited in size due to the loudspeaker occupying space immediately next to the means 5.

Figure 2:
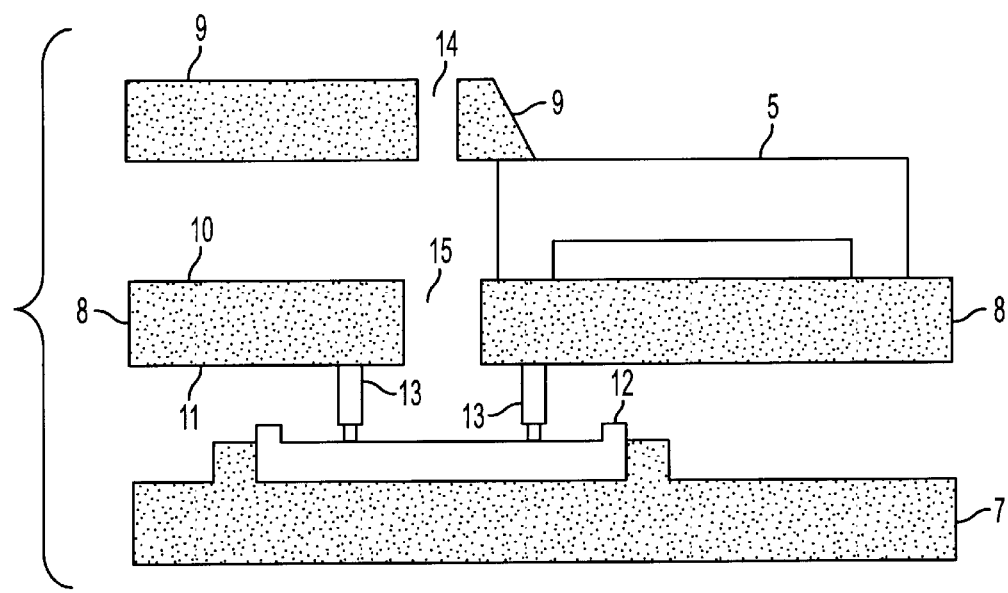
FIG. 2 shows a first preferred embodiment of the invention.

FIG. 2 shows a cross-sectional view through a first preferred embodiment of the invention. In this embodiment the loudspeaker 12 is mounted on the inner side of a back cover 7. The loudspeaker 12 is connected electrically to a printed circuit board a by means of connectors 13. In a preferred embodiment the connectors 13 are e.g. surface mounted pogo pins which establish contact with the speaker by pressing against contact pads (not shown) on the speaker 12. The printed circuit board 8 has an opening 15 for transmission of sound from the speaker 12 to the surroundings via the opening 15 in the printed circuit board and the opening 14 in the front cover 9. In a preferred embodiment the aperture of the opening 15 is larger than the aperture of the opening 14. Thereby the intensity of the sound generated by the loudspeaker is transferred to the surroundings with only a relatively small loss of intensity.

In this embodiment the speaker does not occupy space on the back side of the front cover 9, and it is thus possible to use larger means 5 (e.g. a display or a keypad) for operating the electronic device or to move the means 5 closer to the opening 14.

Figure 3:
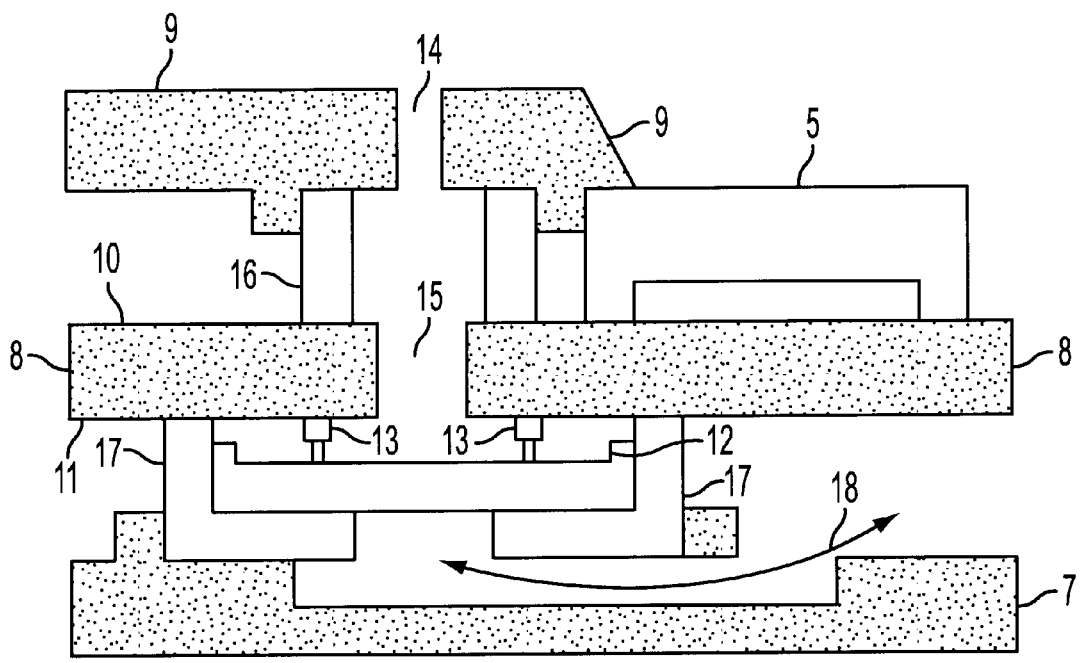
FIG. 3 shows a second preferred embodiment of the invention.

FIG. 3 shows a cross-sectional view through a second preferred embodiment of the invention. This embodiment differs from the embodiment shown in FIG. 2 in that the loudspeaker assembly further comprises two gaskets 16 and 17 enclosing a first resonance box and a second resonance box, respectively. Further, the loudspeaker 12 is coupled to a sound channel allowing for passage of sound generated by the loudspeaker. This is illustrated with the arrow 18. In practice, the type of speaker dictates whether this sound channel is needed or not.

The first resonance box, enclosed by the gasket 16, causes an additional resonance frequency to occur in the sound pressure versus frequency diagram for the loudspeaker assembly. This provides the acoustic engineer dimensioning the loudspeaker assembly with more degrees of freedom. Essentially, it becomes easier to provide a relatively high sound pressure (about 2–5 dB) at higher frequencies (about 1500 Hz–3 KHz).

Further, due to the fact that sound pressure and the characteristics of the sound transmitted to the surroundings are substantially determined by the first and second resonance boxes, the surroundings (e.g. a listener's ear cavity) only play a minor role in the reproduction of sound. Thereby, only minor constraints regarding the design of the front cover should be fulfilled in order to obtain a good reproduction of sound. Further, the designer is allowed to put more focus on man-machine-interface aspects.

In a preferred embodiment the gaskets 16 and 17 have a cylindrical shape. The gaskets can be made of rubber, a plastic material, or another suitable material. The openings 14 and 15 can be supplied with some type of acoustic valve e.g. in the form of a wool-like material. The interior of the first and second resonance boxes may be filled or partly filled with some type of material expedient for enhancing the reproduction of sound.

The loudspeaker can be of different types comprising e.g. electromagnetic types, piezo-electric types, or electrostatic types.

Although preferred embodiments of the method and apparatus of the present invention have been illustrated in the accompanying drawings and described in the foregoing detailed description, it is understood that the invention is not limited to the embodiments disclosed, but is capable of numerous rearrangements, modifications, and substitutions without departing from the spirit of the invention as set forth by the following claims.

What is claimed is:

1. A loudspeaker assembly for use in an electronic device with a front cover and a back cover, comprising:

a board having a first side facing the front cover and having user interface means accessible through the front cover, a second side facing the back cover, and an opening through the board;

a loudspeaker for emitting sound through the front cover, the loudspeaker being arranged between the board and the back cover; and a first resonance box located between the board and the front cover, the first resonance box comprising the opening through the board, an opening in the front cover, and a gasket between the front cover and the board.

2. A loudspeaker assembly according to claim 1, further comprising a second resonance box coupled to the loudspeaker, the second resonance box located between the board and the back cover, and the second resonance box comprising the opening through the board.

3. A loudspeaker assembly according to claim 2, wherein the opening through the board connects the first and second resonance boxes.

4. A loudspeaker assembly according to claim 2, wherein the first resonance box has a relatively small inner cross sectional area in a plane substantially parallel to the board compared to the cross sectional area, in a plane substantially parallel to the board, of the second resonance box.

5. A loudspeaker assembly according to claim 2, wherein the loudspeaker is connected to the board by electrical connectors extending within the second resonance box.

6. A loudspeaker assembly according to claim 2, wherein the second resonance box comprises the opening in the board, the loudspeaker, and a gasket arranged between the board and the loudspeaker.

7. The loudspeaker assembly as in claim 6, wherein the inner diameter of the first resonance box is relatively small compared to the inner diameter of the second resonance box.

8. A loudspeaker assembly according to claim 1, wherein the first resonance box has a relatively small inner diameter in a plane substantially parallel to the board compared to the diameter of the loudspeaker.

9. A loudspeaker assembly according to claim 1, wherein the loudspeaker is attached to the second side of the board to form the second resonance box.

10. A loudspeaker assembly according to claim 1, wherein the loudspeaker is attached to an inner side of the back cover, the inner side facing towards the second side of the board.

11. A mobile telephone comprising a loudspeaker assembly as set forth in claim 1.

* * * * *